United States Patent [19]
Michaels et al.

[11] Patent Number: 5,384,572
[45] Date of Patent: Jan. 24, 1995

[54] TESTING OF AIRBORNE WINDSHEAR RADARS

[75] Inventors: John F. Michaels, East Patchogue; William L. Rubin, Whitestone, both of N.Y.

[73] Assignee: Republic Electronics Co., Hauppauge, N.Y.

[21] Appl. No.: 111,847

[22] Filed: Aug. 25, 1993

Related U.S. Application Data

[63] Continuation of Ser. No. 76,252, Jun. 11, 1993.

[51] Int. Cl.⁶ .............................................. G01S 7/40
[52] U.S. Cl. .............................. 342/169; 342/171; 342/172
[58] Field of Search .................. 342/169, 171, 172

Primary Examiner—Mark Hellner
Attorney, Agent, or Firm—Kenneth P. Robinson

[57] ABSTRACT

A portable test system is arranged to enable testing of an aircraft-mounted radar system. Simulated radar returns are transmitted via a test antenna positioned a short distance from an aircraft parked on an airport surface. The varying amplitude of received radar pulses is analyzed as the test antenna is illuminated by the main beam and side lobes of the radar antenna pattern as the radar beam is scanned. By controlling the amplitude of the simulated radar returns in inverse relation to the amplitude of received radar pulses, simulated radar returns inserted off beam center line are interpreted by the radar system as received on the beam center line. Test system transmissions, which may incorporate windshear effect test data, are thus enabled to create simulated effects usable for testing radar system response to a variety of airborne conditions, such as windshear. Test methods are also described.

15 Claims, 2 Drawing Sheets

TESTING OF AIRBORNE WINDSHEAR RADARS

This is a continuation of copending application Ser. No. 08/076,252 filed on Jun. 11, 1993.

The invention relates to systems and methods for the testing of operational capabilities of radar systems. More particularly, economical testing of aircraft-mounted windshear detection radar is enabled by operation of a portable test set placed in front of the radar while the aircraft is parked on the ground.

BACKGROUND OF THE INVENTION

Increasingly, the potential dangers inherent in operation of commercial and other aircraft in the presence or vicinity of dangerous windshear conditions are being recognized. With such recognition and the development of data representative of the presence of airborne windshear conditions, the capabilities of airborne radar systems have been adapted for detection of conditions indicative of windshear. Two attributes of such detection are significant. First, the indicative conditions are difficult to detect and evaluate when present, thereby requiring regular testing of radar systems to ensure that operation is adequate to meet relevant windshear detection standards. Also, actual windshear conditions are relatively rare and unpredictable, so that the simulation of indicative conditions must be reliably employed in radar system testing. These and other relevant factors establish the need for reliable test systems and methods for field testing aircraft-installed windshear radar systems accurately, reliably, without radar system disassembly, without extended out of service periods, and without requiring complex test equipment or test set ups.

The flight hazard represented by the presence of windshear conditions may be represented by a so-called "F-factor". The F-factor has been used as a non-dimensional hazard index directly related to the rate of climb capability, or lack thereof, of an aircraft in windshear. Negative values of F indicate a performance-increasing situation and positive values indicate increasingly threatening conditions. Under windshear conditions in a microburst downdraft region with wind vertically downward, a positive F-factor will indicate a potentially dangerous situation.

An airborne windshear detection radar typically derives horizontal wind velocity values by Doppler measurement of radar returns from aerosols, raindrops and other materials which may be dispersed in the air (all of which tend to move with the same velocity and direction as the horizontal air movement or wind). Differences in horizontal wind velocity as a function of range thus permit estimation of the rate of change of the horizontal component of windshear. However, known types of airborne radar systems cannot measure wind velocities perpendicular to the radar line of sight. This inability to measure vertical (downdraft) velocity represents a serious factor in the ability to evaluate windshear phenomenon under actual flight conditions. In view of this, significant effort by workers in this field has been directed to developing methods for estimating vertical wind velocity under various conditions from radar horizontal wind measurements, in order to improve F-factor calculation accuracy. Existing and possible future improved methodologies for evaluating and simulating windshear effects and conditions may advantageously be taken into account for radar testing purposes.

It is therefore an object of this invention to provide portable and economical test systems which are readily field deployable to test windshear detection capabilities of aircraft radar systems.

An additional object is to provide such test systems able to monitor radiated windshear radar signals from distances of the order of fifty feet and radiate back to the radar test signals which have been responsively proportioned and may include windshear simulation test data.

Further objects are to provide new and improved test systems and methods, including such systems and methods suitable for field testing of radar systems by use of radiated test signals which are amplitude modulated and timed for near real-time response to reception and analysis of signals currently radiated by a radar system under test.

SUMMARY OF THE INVENTION

In accordance with the invention, a portable test system, providing simulated windshear returns for testing a radar system radiating radar pulse signals in a scanned antenna beam pattern, includes a test antenna suitable for positioning at a predetermined distance from a radar system for illumination by radar pulse signals of varying amplitude via the scanned antenna beam pattern. Transmitter means radiate simulated windshear returns via the test antenna and receiver means process received radar pulse signals of varying amplitude. Modulator means which utilize a tapped delay line providing a plurality of delayed pulse signals are included for providing simulated windshear return and clutter return signals to the transmitter in response to received radar pulse signals. Test data means, coupled to the modulator means, store windshear test data and clutter test data to be included in the simulated windshear return signals and memory means store radar data representative of selected characteristics of the radar pulse signals and scanned antenna beam pattern. Signal processing means, coupled to the receiver means and responsive to radar data stored in the memory means, are arranged for (i) determining the amplitude of the largest received radar pulse signal as a reference amplitude, (ii) controlling the amplitude of the simulated windshear return signals in relation to a comparison of the varying amplitude with such reference amplitude, and (iii) selectively controlling inclusion of windshear test data and clutter test data in the simulated windshear return signals.

Also in accordance with the invention, a method for testing a radar system radiating radar pulse signals in a scanned antenna beam pattern, by transmitting simulated radar return signals, comprises the steps of:

(a) receiving a first radar pulse signal having a first amplitude, a second radar pulse signal having a second amplitude and successive radar pulse signals of different amplitudes as the antenna beam pattern is scanned across a fixed test position;

(b) providing a base signal having predetermined timing relative to the time of receiving the first radar pulse signal in step (a);

(c) modifying the step (b) base signal by inclusion of test data to provide a simulated radar return signal;

(d) amplifying the step (c) simulated radar return signal by a gain value representative of the difference between the first amplitude and a predetermined reference amplitude;

(e) transmitting the simulated radar return signal from the fixed test position toward the radar system after the step (d) amplifying of such signal; and (f) repeating steps (b) through (e) for at least the second radar pulse signal having such second amplitude.

DESCRIPTION OF THE INVENTION

Figure 1:
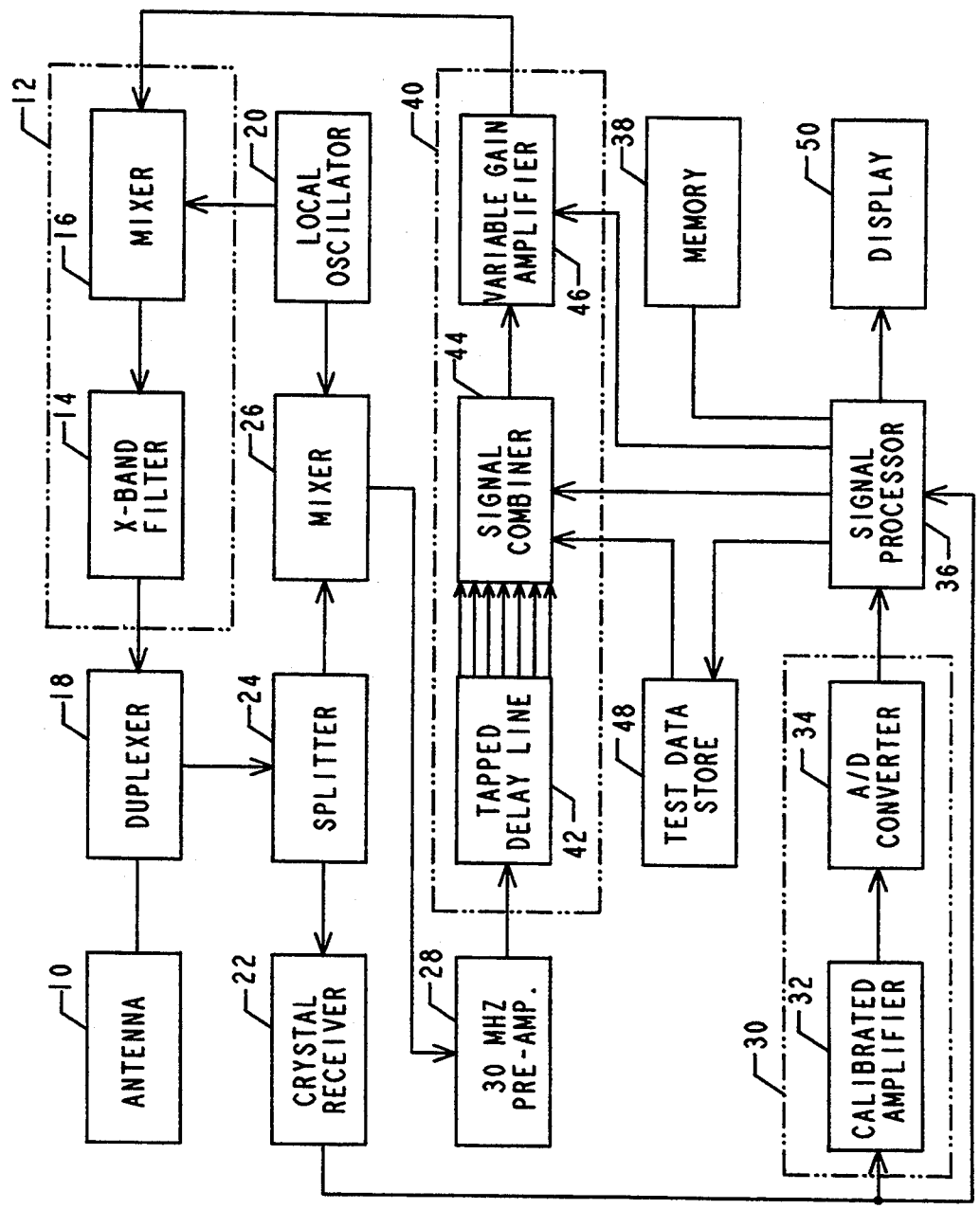
FIG. 1 is a block diagram of a test system in accordance with the invention.

An embodiment of a portable test system in accordance with the invention is illustrated in FIG. 1. The test system is adapted for radiating simulated radar returns for testing a radar system, such as a windshear detection radar system installed in the nose of a commercial airliner or other aircraft. This test system is adapted to be placed relatively close to the aircraft radar so as to be illuminated by the scanned beam of the radar. Such airborne radar systems typically utilize an antenna having a focused beam pattern providing the highest level of antenna gain on beam centerline and a decreasing gain profile off beam centerline. In operation, with the antenna beam scanned back and forth across a range of azimuth angles, the radar system design is such that the azimuth of a radar return is always interpreted as corresponding to the azimuth orientation of the beam centerline at the time that a radar return is received. As will be described further, test systems in accordance with the present invention provide simulated radar return signals whose amplitude is time varied in inverse relation to the radar antenna beam profile. As a result, the direction of a simulated radar return as perceived by the radar system is controlled by the test system. This permits the simulation of a variety of radar returns for test purposes, as will be described.

As shown in FIG. 1 the test system includes a test antenna 10 suitable for positioning at a predetermined test distance from a radar system to be tested. As so positioned, the test antenna 10 will be illuminated by radar pulse signals of varying amplitude as the antenna beam pattern is scanned back and forth. For a typical airborne X-band radar having a beam width of about 3.2 degrees, the corresponding radar antenna aperture is approximately one-half meter wide. As generally defined, the far field for such an antenna begins at a distance of about 15.6 meters, or 50 feet, from the radar antenna. For testing such a radar, the present test antenna 10 would typically be positioned at a predetermined distance of 50±5 feet in front of the radar antenna. The portable nature and ease of use of the test system are thus enhanced by avoiding the need for extended test distances.

The FIG. 1 test system also includes transmitter means 12 for radiating simulated radar returns via test antenna 10. As shown, transmitter means 12 comprises an X-band filter 14 fed by mixer 16. Duplexer 18 is connected between transmitter means 12 and test antenna 10 to enable transmission and reception via the same antenna in well known manner. In providing simulated radar returns (which are inherently low power signals) over a short distance (such as 50 feet) with an appropriately designed test antenna, the combination of filter 14 and mixer 16 fed by local oscillator 20 provides sufficient transmitter power in this embodiment. This arrangement is consistent with an objective of providing a relatively simple and economical test system. In other embodiments, other known types of transmitter arrangements may be employed.

As illustrated, the test system of FIG. 1 includes receiver means, shown as crystal-video receiver 22, coupled to test antenna 10 via the duplexer 18. In this arrangement, crystal-video receiver 22 is effective to convert received radio frequency (RF) radar signals directly to video signals. Known forms of crystal-video receivers require no RF or intermediate frequency (IF) signals, resulting in simplicity, small size, low cost and broad RF bandwidth. The lower sensitivity of a crystal-video receiver relative to a superheterodyne receiver is not a constraint in the FIG. 1 embodiment. With no local oscillator input, the crystal receiver 22 would operate as a square law device providing a distorted video pulse output at low input power levels (e.g., −30 to −50 dBm). In order to provide operation in the crystal detector's linear detection range, even while receiving radar signals from −30 dB radar beam sidelobes, the aperture of test antenna 10 is specified so as to provide adequate gain. Thus, in a design of the FIG. 1 test system embodiment, a test antenna in the form of a horn having an aperture of about 0.6 square centimeters was determined to be sufficient to maintain the level of received X-band radar pulse signals at or above −30 dBm, so as to be consistent with operation to a level of −30 dB in the beam sidelobes of the radar antenna. The small size of the required aperture of test antenna 10, as thus determined, is consistent with the objective of providing a readily portable test system. The receiving and transmitting functions are enabled and supported by the inclusion of received signal splitter 24 feeding both crystal receiver 22 and mixer 26. Mixer 26 is responsive to signals from local oscillator 20 in providing a 30 mHz IF signal to pre-amplifier 28 for further processing.

The FIG. 1 test system further includes sampling means 30 coupled to crystal receiver 22. As shown, sampling means 30 includes calibrated amplifier 32 coupling video-type detected signals from receiver means 22 to analog-to-digital (A/D) converter 34. In this embodiment, unit 34 is a 10 bit A/D converter with a 60 dB dynamic range which operates to sample the video signal every 0.1 microseconds. The gain of amplifier 32 is adjusted so that a −30 dBm RF signal coupled to test antenna 10 is a threshold level signal which just triggers the lowest level bit of the 10 bit range of A/D converter 34. The adjustment of the gain of calibrated amplifier 32 permits compensation for varying crystal detector sensitivities, so that samples produced by action of A/D converter 34 are representative of the amplitude of radar signals received at the test antenna.

The embodiment of FIG. 1 also includes signal processor means 36, one of whose functions is to cause amplitude data representing the amplitude of radar pulse signal samples exceeding the −30 dBm threshold to be stored in memory means 38. Such amplitude values are preferably stored over a period of two complete scans of the antenna beam of the radar system under test. By excluding lower level signals, the −30 dBm threshold level for sampling by A/D converter 34 is also effective to limit necessary storage of sampled signals in memory means 38. As will be further described, signal processor 30 utilizes the stored amplitude data to derive radar system parameters representative of selected operational characteristics of the radar pulse signals and scanned antenna beam pattern as radiated by the radar system under test.

As shown in FIG. 1, the pre-amplifier 28 couples an IF representation of radar pulse signals received at test antenna 10 from mixer 26 to modulator means 40. In this embodiment, modulator means 40 comprises the combination of tapped delay line 42, signal combiner 44 and variable gain amplifier 46. As will be further described with reference to FIG. 2, delay line 42 may be a surface acoustic wave (SAW) delay line effective to generate multiple delayed replicas of a received radar pulse over a desired simulated radar return or echo interval. For example, for each one microsecond width pulse received from a radar system under test, the output of tapped delay line 42 may comprise a seven microsecond long return, delayed four microseconds relative to the received radar pulse. Different delay line characteristics would be provided for use with radar transmitted pulse widths different than the one microsecond width in this example. Signal combiner 44 receives test data from test data means, shown as test data store 48, under the control of signal processor 36. Test data simulating or reproducing radar returns representative of (i) ground clutter, (ii) clutter plus a wind velocity return, (iii) windshear effects, and (iv) windshear effects with clutter, for example, may be stored in test data store 48. Signal combiner 44 is effective to cause the output of delay line 42 to be modulated by such simulated radar return data from test data store 48 and combined to provide simulated radar return signals which are coupled to variable gain amplifier 46 in response to each radar pulse representation coupled to delay line 42 from amplifier 28. In this way, a seven microsecond long return whose amplitude and phase (see FIG. 2) or I and Q (see FIG. 3) change each microsecond over such seven microsecond interval is provided in response to each radar interrogation pulse.

The resulting simulated radar return signals are amplitude adjusted in variable gain amplifier 46 in inverse relation to the received radar pulse amplitude. The desired amplitude control inversely responsive to varying pulse-to-pulse amplitude of received radar signals (resulting from the varying gain characteristics of the scanned antenna beam pattern) is provided by a gain control signal coupled to amplifier 46 from signal processor 36. Signal processor 36 provides such gain control signal in response to signals from crystal receiver 22 representative of received radar pulse amplitude. Viewed differently, the gain control signal is thus effective to adjust the gain in relation to the difference in amplitude between a received radar pulse signal and a reference amplitude, such as the maximum received radar pulse amplitude. The simulated radar return signals from variable gain amplifier 46 are then coupled to transmitter means 12 for up-conversion to X-band and radiation from test antenna toward the scanned antenna of the radar system under test.

The FIG. 1 test system also includes means for displaying derived and other test data, shown as display 50, coupled to signal processor 36. As will be described with respect to operation, the test system is effective to derive data representative of operative parameters of the radar system under test. Such data, relating to transmit pulse width, peak power, antenna beam pattern, antenna scan rate, etc., is arranged for appropriate storage in memory 38, which may comprise suitable random access memory (RAM), and selected presentation on display 50, under the control of signal processor 36. Display 50 may comprise liquid crystal, cathode ray tube, or other suitable forms of display devices.

The complete test system as described in this embodiment is suitable for implementation in a form which is compact and readily transportable for field use, so that aircraft may conveniently be parked at a suitable airport location for testing of an airborne radar system mounted on the aircraft. The test antenna may be mounted integrally with the remainder of the test system or the test system may be packaged for separation into an antenna and related component section and an interconnected display and control section for use at a distance from the test antenna, for example. In either case, the antenna portion may be supported by a tripod or other arrangement facilitating positioning and alignment with the aircraft radar antenna.

FIGS. 2 AND 3

Figure 2:
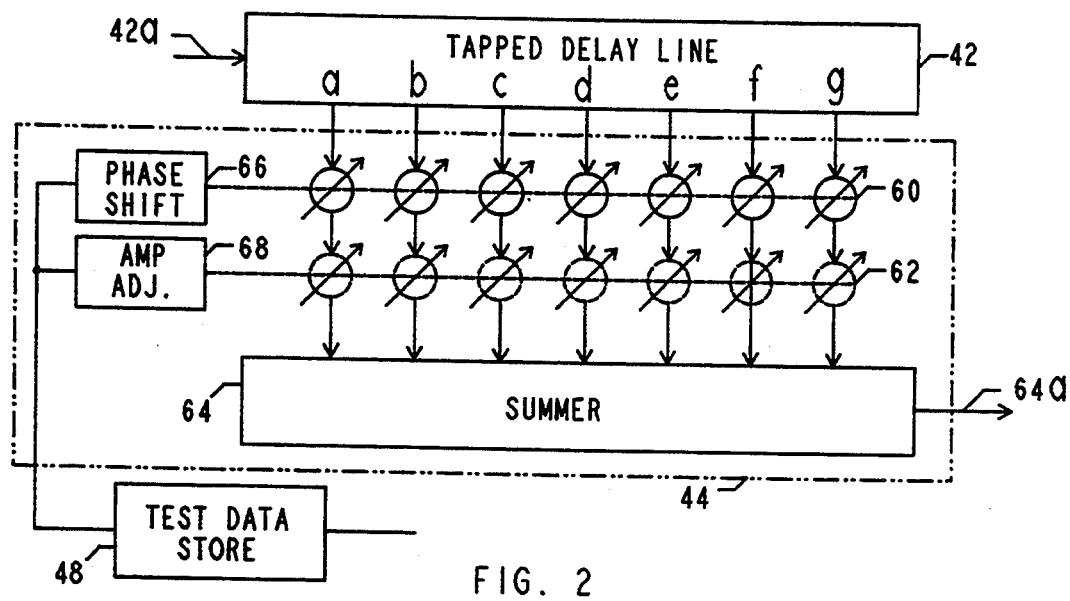
FIGS. 2 and 3 illustrate alternative embodiments of portions of a modulator arrangement for the FIG. 1 system.

Referring now to FIG. 2, there is shown a first embodiment of the combination of tapped delay line 42 and signal combiner 44. As illustrated, a SAW delay line 42 receives radar pulse signal inputs at input 42a from pre-amplifier 28 of FIG. 1. Seven replicas of each radar pulse signal are provided at the outputs labelled a through g. Delayed pulse signals at outputs b through g each have a successive one microsecond delay following the pulse signal at output a, which follows the respective radar pulse signal input by four microseconds in this example. This four microsecond time delay is arbitrary, since radar system range accuracy is not directly pertinent to the stated objective of windshear detection testing. The four microsecond basic delay as specified here provides time for the crystal-video detector 22 to process the received radar pulse and for signal processor 36 to implement the appropriate gain adjustment in variable gain amplifier 46. It also permits the airborne radar under test to switch from transmit to receive. In some applications it may be desirable to increase the basic delay from 4 microseconds to 6 to 8 microseconds, to allow the airborne radar sensitivity time control (STC) to decay to zero. This will help to minimize the test system transmit power requirements.

Figure 3:
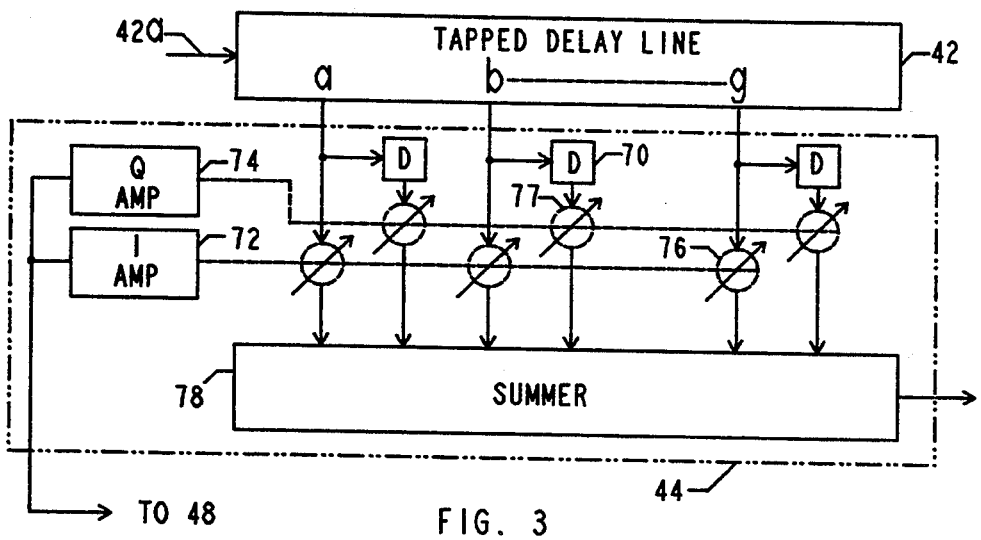

After coupling from delay line 42 to signal combiner 44, the seven delayed pulse signal replicas are subjected to phase and amplitude adjustment in phase shifters, such as shown at 60, and amplitude adjusters, such as shown at 62, and then combined in summer 64 for coupling to variable gain amplifier 46 via output 64a. Phase and amplitude adjustments suitable for simulation of desired radar returns, such as representative of windshear effects, are applied to the phase and amplitude adjustment devices, such as shown at 60 and 62, by action of phase and amplitude control units 66 and 68 in response to test data coupled from test data store 48, as discussed with reference to FIG. 1. FIG. 3 illustrates an alternative form of signal combiner 44. As shown for outputs a, b and g of the seven delayed pulse outputs of delay line 42, respective I amplitude adjustments are applied to one portion of each of the seven basic delayed pulse replicas. A separated portion of each delayed pulse replica is delayed by 90 degrees in individual delay lines, such as shown at 70, and subjected to a respective Q amplitude adjustment. Amplitude control units 72 and 74 are effective to implement the desired I and Q amplitude adjustments, via amplitude adjusters as shown at 76 and 77, in response to test data representative of simulated radar return signals from test data store 48. The adjusted pulse replica portions are combined in summer 78 for coupling to variable gain amplifier 46.

While use of SAW delay line devices is currently considered the preferred mode of implementing modulator means 40, other arrangements can be provided by skilled persons. For example, an alternative approach uses each received radar pulse to frequency and phase lock a coherent oscillator (COHO) in order to provide phase and amplitude control of a simulated radar return signal in response to stored test data. It should be recognized, however, that a phase-locked oscillator may have marginal spectral purity, since a requirement for high frequency stability tends to conflict with the phase locking requirement. Regardless of the selected form of implementation of the modulating function, two related technical requirements should be satisfied. First, the simulated radar return sent to the radar system under test must be highly coherent with the signal transmitted by the radar system. This implies high frequency stability and very low noise side bands. Second, the simulated radar return pulse train signal must be amplitude and phase modulated in a manner to simulate radar returns (e.g., clutter or microburst windshear or both) over a selected echo interval.

OPERATION

The test system as described is arranged for operation in three modes: initialization, receive tests and transmission tests.

The initialization mode encompasses appropriate test system self checking, a check of operative detection of received radar pulses, determination of the radar system pulse repetition frequency (PRF) and synchronization of the test system circuitry to the radar PRF. During initialization, the aircraft radar transmits radar signals comprising radar pulses via its antenna which provides a scanned beam determined by the focused radiation pattern or beam pattern of the antenna. Pulsed radar signals received via the test antenna 10, which is typically a small horn, are detected and amplitude sampled every 0.1 microseconds. Only signals of amplitude exceeding a pre-set threshold (e.g., $-30$ dBm) are stored in memory 38.

The difference between successive measured pulse signal samples (that exceed the pre-set threshold) are analyzed during each received pulse. When the amplitude difference between successive pulse samples decreases twice in a row after a sequence of increasing amplitude differences, the time is noted. This establishes a reference point during the radar pulse rise time which (1) permits the measurement of the radar PRF, (2) synchronizes internal logic and measurement circuitry to the radar PRF, and (3) establishes a pre-trigger synchronism pulse for the next pulse measurement interval.

When a test signal is activated, a counter is energized which initiates data taking on a fixed number of received pulses, e.g., 100,000. The counter is pre-set to 99,999 and counts down each time a pre-trigger pulse is received. This provides a time reference for each group of received radar pulse samples. The number actually entered into the counter should correspond to the number of radar pulses expected to be received over at least two scans of the aircraft antenna pattern, which will typically occur in about 20 seconds. At a nominal radar PRF of 5,000 pulses per second, data samples 0.1 microsecond apart will be recorded for 100,000 pulses. Radar pulsewidths used for windshear detection are typically 1 to 1.5 microsecond. Assuming an average of 30 amplitude measurements on each received pulse, $3 \times 10^6$ (10-bit) samples are stored during the test interval (about 4 megabytes of stored data). This data is sufficient to permit determination of transmit pulsewidth, peak power, antenna beam pattern and antenna scan rate.

Figure 4:
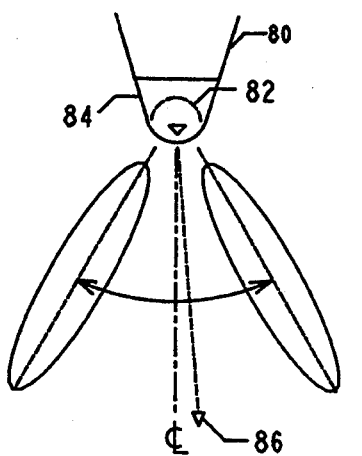
FIGS. 4 and 5 represent plan and side views of a test system positioned for testing of an aircraft-mounted radar system.
Figure 5:
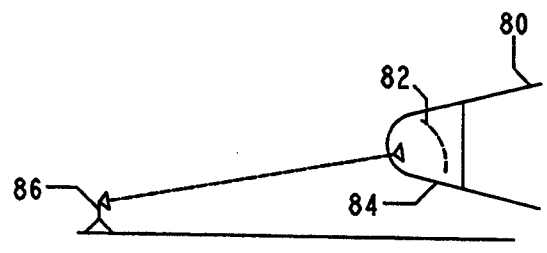

In preparation for testing, the test antenna is positioned in front of the aircraft-under-test at a distance of $50 \pm 5$ feet, in this example, as illustrated in FIG. 4. The nose of the aircraft 80 in FIG. 4 is shown with the radar antenna 82 enclosed by a radome 84 and test antenna 86 positioned in front of the aircraft. The surface area illuminated by the scanning aircraft radar should be reasonably unencumbered by radar reflecting surfaces. This condition is normally met if the maximum obstacle height for one kilometer in the area in front of the radar is two feet, from one to two kilometers is 30 feet and from two to four kilometers is 60 feet. The typical aircraft radar antenna should be depressed eleven degrees with respect to the horizontal, as illustrated in the side view of FIG. 5. If two or more radar elevation scan positions are used for detecting windshear, the highest elevation scan angle should typically correspond to a depressed angle of eleven degrees with respect to the horizontal. The horn antenna 86 of the test system should be located about two feet above ground level and pointing up at a fixed angle of eleven degrees. It should be aimed in azimuth at the aircraft radome (e.g., by use of a sighting device on the test antenna).

In the receive test mode, tests are performed with the aircraft radar antenna transmitting and scanning in the windshear detection mode, for example. Because the test antenna 86 is stationary, the signal received will vary over an approximately $-35$ dB range as the main beam and sidelobes of the radar antenna scan across the test antenna, as indicated conceptually in FIG. 4. As described, the test system utilizes a crystal-video receiver which converts the RF signal received by the test antenna directly to a video signal. A crystal-video receiver has no RF or IF circuits, resulting in simplicity, small size, low cost, and broad RF bandwidth. To operate in the crystal detector's linear detection range, the test antenna provides a minimum RF input power level of $-30$ dBm when receiving signals from $-30$ dB radar antenna sidelobes. This is accomplished as described above, so that digital signal processor 36 provides for storage in memory 38 of the amplitudes of received RF signals exceeding $-30$ dBm over two complete scans of the radar antenna. Using this stored radar data, signal processor 36 utilizes known types of data processing and analysis techniques to derive values for the following characteristics of the radar pulse signals and beam pattern.

(A) Transmit Pulse Width—Several hundred pulses will be received during the interval in which peak radar antenna gain is aimed at the test antenna. To obtain accurate pulse width measurements, the 50 largest received pulse signals are selected for this measurement. (The same pulses are also used to measure peak radar transmitted power.) By interpolating between sampled values the 3 dB pulse width for each of the 50 pulses is determined. The average pulse width over all 50 pulses is the derived radar pulse width measurement.

(B) Antenna Beam Pattern—The antenna beam pattern is determined by first averaging the five largest sampled amplitudes for each received pulse and storing this information. The antenna beam pattern test is limited to determining whether the major antenna lobe width and the magnitude of the azimuth sidelobe on each side of the major lobe fall within acceptable limits as applicable to the type of radar under test.

(C) Peak Power—The five-sample averaged amplitude for each of the 50 largest pulses are averaged together. This average value is transformed into received peak RF power using calibrated values stored in memory. Entering the measured separation between the test antenna and the radar radome permits determination of peak transmitted radar power.

(D) Antenna Scan Rate—The antenna scan rate is measured by the number of times the major antenna beam is sensed during scanning within the test interval.

As indicated, test data is accumulated over approximately two complete antenna scans (e.g., scans while the radar is in its windshear detection mode in this example). After derivation of this radar data representative of the selected characteristics of the pulse signals and beam pattern such as described, values of such characteristics may be displayed on the test system display 50.

In the transmission test mode, after satisfactory completion of receive-only test, simulated radar returns in the form of four different (appropriately delayed) pulse trains are transmitted in response to received windshear detection type radar interrogations. These pulse trains are amplitude and phase modulated to simulate radar returns of four types (1) clutter return, (2) clutter plus a (test) wind velocity signal, (3) windshear return without clutter, and (4) windshear return embedded in moderate clutter. The four tests are performed sequentially so that failure of a particular test provides fault location information about the airborne radar. An observer located in the aircraft cockpit signals to the test system operator to indicate which test, if any, the radar fails to pass.

Both the transmit and receive tests are performed with the aircraft radar antenna transmitting and scanning in the windshear detection mode. Because the test antenna is stationary, the signal received will vary by about −35 dB as the radar antenna scans past. To compensate for the variation in scanning antenna gain, the return signal is amplified in inverse relation to such varying gain prior to retransmission to compensate for the reduced radar antenna again. The amount of such compensatory amplification is determined by comparing the received radar pulse amplitude with the largest pulsed signal received in the receive test mode, which is performed first.

The operational steps in forming and transmitting a basic simulated radar return have been described in substantial detail with reference to the different components of the FIG. 1 system. Test data suitable for use in simulating the four types of radar returns listed above is stored in test data store 48. As a radar pulse of amplitude exceeding the −30 dBm threshold level is received, an IF representation of such pulse is fed to tapped delay line 42 from mixer 26 and a sampled video representation of the same pulse is fed from crystal receiver 22 to signal processor 36. In response to the pulse, tapped delay line 42 provides a suitably delayed train of seven replica pulses which may be considered a base signal from which the simulated radar return is to be formed. This pulse train, or base signal, is then amplitude and phase (or I and Q) modulated and combined in signal combiner 44, so as to provide a signal which incorporates a representation of test data from test data store 48. Such test data may simulate one of the four types of radar returns listed above for testing windshear detection capabilities. The resulting signal is coupled to variable gain amplifier 46, where its amplification gain is controlled by a signal from signal processor 36 in response to the sampled video representation of the received radar pulse from crystal receiver 22. Signal processor 36 is effective to implement a comparison of the amplitude of such current received radar pulse with the amplitude of the largest received radar pulse (as previously determined in the receive test mode) so that the gain of amplifier 46 is adjusted in inverse relation to the amplitude of the current received radar pulse. Following action of the transmitter 12, the simulated radar return is radiated toward the radar antenna via test antenna 10.

With an understanding of the invention, it will be apparent that a variety of different kinds of tests can be performed in tests of different types of radar systems. Many different types of test data can be stored in test data store 48 for inclusion in simulated radar return signals. Such test data may, for example, be based upon radar return data recorded during actual conditions, such as windshear, or may represent test data developed in the laboratory for testing specific radar characteristics. By controlling the radar return amplitude in inverse relation to the amplitude of received radar signals from the operating radar, in accordance with the invention, signals radiated from the direction of the test antenna can be caused to be interpreted by the radar system as a radar return from an object at any desired direction relative to the radar antenna. As described, this result is achieved because the inverse amplitude relationship permits signals to be received into the sidelobes at angles off the radar antenna beam centerline and the radar system then interprets such signals as having been received on beam centerline.

While there have been described the currently preferred embodiments of the invention, those skilled in the art will recognize that other and further modifications may be made without departing from the invention and it is intended to claim all modifications and variations as fall within the scope of the invention

What is claimed is:

1. A portable test system, providing simulated radar returns for testing a radar system radiating radar pulse signals in a scanned antenna beam pattern, comprising:
   a test antenna suitable for positioning at a predetermined distance from said radar system for illumination by radar pulse signals of varying amplitude via said scanned antenna beam pattern;
   transmitter means for radiating simulated radar returns via said test antenna;
   receiver means, coupled to said test antenna, for processing received radar pulse signals of varying amplitude;
   modulator means, coupled to said test antenna, for providing simulated radar return signals to said transmitter in timed response to said received radar pulse signals;
   test data means, coupled to said modulator means, for storing test data to be included in said simulated radar return signals;
   memory means for storing radar data representative of selected characteristics of said radar pulse signals and scanned antenna beam pattern; and
   signal processing means, coupled to said receiver means and responsive to said radar data stored in said memory means, for controlling amplitude of said simulated radar return signals in inverse relation to said varying amplitude of said received radar pulse signals and for selectively controlling inclusion of test data in said simulated radar return signals;

whereby, said simulated radar returns are time and inverse amplitude coordinated with said received radar pulse signals of varying amplitude.

2. A portable test system as in claim 1, wherein said test antenna is proportioned and arranged to be supported on an airport surface in front of an aircraft-mounted radar antenna in the vicinity of the beginning of the far field range of said radar antenna.

3. A portable test system as in claim 1, wherein said transmitter means comprises a mixer and filter combination coupled to a local oscillator.

4. A portable test system as in claim 1, wherein said receiver means comprises a crystal receiver providing a video frequency output directly from said received radar pulse signals.

5. A portable test system as in claim 1, wherein said modulator means comprises a surface acoustic wave delay line providing a plurality of time delayed pulses in response to each of said received radar pulse signals.

6. A portable test system as in claim 1, wherein said modulator means comprises a variable gain amplifier responsive to gain control signals inversely related to said varying amplitude of said received radar pulse signals.

7. A portable test system as in claim 1, additionally comprising an analog-to-digital converter, coupled to said receiver means, for sampling each pulse of said received radar pulse signals having an amplitude exceeding a predetermined threshold level to provide radar data representative of the relative amplitudes of said sampled pulses.

8. A portable test system as in claim 7, wherein said signal processing means utilizes said radar data from said analog-to-digital converter to derive a value representative of a least one of the following characteristics of said radar system: radar signal pulse width; radar peak power; antenna beam pattern; and antenna scan rate.

9. A portable test system as in claim 8, additionally comprising a display, coupled to said signal processing means, for displaying data representative of at least one of said characteristics derived by said signal processing means.

10. A portable test system, providing simulated windshear returns for testing a radar system radiating radar pulse signals in a scanned antenna beam pattern, comprising:

a test antenna suitable for positioning at a predetermined distance from said radar system for illumination by radar pulse signals of varying amplitude via said scanned antenna beam pattern;

transmitter means for radiating simulated windshear returns via said test antenna;

receiver means, coupled to said test antenna, for processing received radar pulse signals of varying amplitude;

modulator means, coupled to said test antenna, utilizing a tapped delay line providing a plurality of delayed pulse signals for providing simulated windshear return signals to said transmitter in response to said received radar pulse signals;

test data means, coupled to said modulator means, for storing windshear test data to be included in said simulated windshear return signals;

memory means for storing radar data representative of selected characteristics of said radar pulse signals and scanned antenna beam pattern; and signal processing means, coupled to said receiver means and responsive to said radar data stored in said memory means, for determining the amplitude of the largest received radar pulse signal as a reference amplitude, for controlling amplitude of said simulated windshear return signals in relation to a comparison of said varying amplitude with said reference amplitude, and for selectively controlling inclusion of windshear test data in said simulated windshear return signals.

11. A method for testing a radar system radiating radar pulse signals in a scanned antenna beam pattern, by transmitting simulated radar return signals, comprising the steps of:

(a) receiving a first radar pulse signal having a first amplitude, a second radar pulse signal having a second amplitude and successive radar pulse signals of different amplitudes as said antenna beam pattern is scanned across a fixed test position;

(b) providing a base signal having predetermined timing relative to the time of receiving said first radar pulse signal in step (a);

(c) modifying said step (b) base signal by inclusion of test data to provide a simulated radar return signal;

(d) amplifying said step (c) simulated radar return signal by a gain value representative of the difference between said first amplitude and a predetermined reference amplitude;

(e) transmitting said simulated radar return signal from said fixed test position toward said radar system after said step (d) amplifying of said signal; and (f) repeating steps (b) through (e) for at least said second radar pulse signal having said second amplitude.

12. A method as in claim 11, wherein said step (b) base signal is provided as a plurality of pulses which are replicas of said first radar pulse signal.

13. A method as in claim 11, wherein step (c) comprises modifying said base signal by inclusion of test data representing a windshear effect.

14. A method as in claim 11, wherein step (d) comprises amplifying said simulated radar return signal by a gain value representative of the difference between said first amplitude and a reference amplitude representative of the largest radar pulse signal received during a complete scan of the radar antenna.

15. A method as in claim 11, including the additional step of observing radar performance on an in-aircraft radar display in order to evaluate radar system performance based upon receipt of said simulated radar return signals by said radar system.

* * * * *